Patented Dec. 11, 1934

1,983,542

UNITED STATES PATENT OFFICE 1,983,542

PREPARATION OF ALKYL HALIDES

Lee Cone Holt, Edge Moor, and Herbert Wilkens Daudt, Wilmington, Del., assignors to E. I. du Pont de Nemours & Company, Wilmington, Del., a corporation of Delaware No Drawing. Application July 27, 1932, Serial No. 625,194

14 Claims. (Cl. 260—162)

This invention relates to alkyl halides, more particularly chlorides in which the alkyl group contains less than four carbon atoms, and a process for the manufacture thereof.

It is known that alkyl halides, such as ethyl chloride, have been prepared by passing hydrogen chloride and a corresponding alcohol through an aqueous solution of a metal chloride such as, for example, zinc chloride or ferric chloride, heated to a temperature between 100° and 150° C. In this process as previously operated, it has been customary to allow the reaction to proceed in such a manner that the concentration of the metal chloride solution reaches equilibrium. That is to say, since water is a product of the reaction and the temperature of the metal chloride solution is maintained constant throughout the operation, after the process is under way a state of equilibrium is eventually established in which the concentration of the metal chloride solution does not change appreciably. In producing ethyl chloride by this method by passing ethyl alcohol and hydrogen chloride through a zinc chloride solution maintained at a temperature of about 135–140° C., we have obtained equilibrium concentrations in the zinc chloride solution of the order of about 80% zinc chloride. Since the reaction is exothermic, difficulty has been experienced in maintaining the desired reaction temperature and in order to do this it has been customary to employ external artificial cooling means.

The present invention has for an object the provision of a new and improved process for producing alkyl halides. A further object is the provision of a new and improved process for producing methyl, ethyl and propyl chlorides. A still further object is to produce ethyl chloride by a reaction which proceeds smoothly with higher yields than have heretofore been obtained in commercial operations.

Another object is the provision of an autothermal process for producing ethyl chloride that is, a process of such character that after the reaction is started it may be effected continuously without the application of external heating and cooling means. Other objects will appear hereinafter.

These objects are accomplished according to the broader aspects of the invention by reacting together an alkyl alcohol and a hydrogen halide such as, for example, hydrogen chloride, in the presence of an aqueous metal halide solution while maintaining the volume and concentration of said metal halide solution constant and below the equilibrium concentration at the reaction temperature.

While the invention is susceptible of considerable variation and modification in the manner of its practical application particularly as regards proportions of materials and the exact method of procedure, the following examples will illustrate how it may be practiced. The parts are by weight.

Example I

Sixteen parts of solid zinc chloride were charged into a well-insulated corrosion resistant vessel and 6.8 parts of water added giving a solution having a concentration of about 70%. The temperature of this solution was raised to about 137–138° C. and maintained for a period of eight hours during which time there was introduced into the solution at a rate as uniform as possible, 28.57 parts of 92.5% ethyl alcohol in the form of vapor and 23.2 parts of gaseous hydrogen chloride.

The gases evolved from the surface of the reaction liquid and consisting largely of ethyl chloride, water, hydrochloric acid and some alcohol were recovered continuously and passed through a condenser maintained at a temperature sufficient to condense the water vapors. During the run, water from the condenser was returned to the zinc chloride solution in order to maintain the volume and concentration thereof constant.

Example II

Into a well-insulated corrosion resistant vessel there was charged about 22.8 parts of a solution of zinc chloride having a concentration of about 70% zinc chloride by weight. The temperature of this solution was raised to about 138°–140° C. and maintained for a period of twenty hours, during which time there was introduced into the solution, at a rate as uniform as possible, about 54.8 parts of 92.5% ethyl alcohol in the form of vapor and about 55.4 parts of gaseous hydrogen chloride having a purity of about 94–96%.

The gases evolved from the surface of the reaction liquid were recovered continuously and passed through a condenser maintained at a temperature sufficient to condense the water vapor. Sufficient water from the condenser was returned to the reaction zone to maintain the volume of the reaction mixture constant.

The yields of ethyl chloride obtained as described in the foregoing examples were substantially higher than yields obtained in runs at corresponding temperatures without adding water to the catalyst solution. Furthermore, the procedures described in the examples were effected without external heating or cooling, whereas procedures in which the catalyst solution were allowed to reach the equilibrium concentrations (that is, no water was added) required external cooling to maintain the desired reaction temperature.

In practicing the invention, it is immaterial from what source the water to be added to the catalyst solution is obtained. The advantage of condensing water from the reaction products rather than adding fresh water to the catalyst solution will be apparent, however, in that the returned condensate carries back into the reaction zone at least a portion of the unreacted materials which have passed through the catalyst mass.

Any suitable method may be employed in regulating the amount of water returned to the catalyst solution. In operating the process we have found it to be very desirable to regulate the volume of water returned to the catalyst by conductivity measurements made by means of carbon electrodes inserted into the catalyst solution, a difference in liquid level being indicated by a change in the conductivity of such electrodes when an alternating current is passed through them. In this manner it is possible to control with sufficient accuracy the concentration of the catalyst solution.

While the process is particularly valuable for the production of ethyl chloride, very desirable results are obtained in the preparation of methyl and propyl chlorides from the corresponding alcohols. Alkyl halides such as methyl, ethyl, and propyl bromides may be obtained in a similar manner.

In accordance with the invention certain metal halides other than zinc chlorides may be used satisfactorily as catalysts. Mention may be made of the particular suitability of ferric chloride, antimony chloride and bismuth chloride. The most desirable concentration of the catalyst solution may vary widely depending largely upon the nature of the metal halide catalyst and the reactants, the desired products and the temperature at which optimum yields are obtained. When zinc chloride is the metal halide employed, the concentration of the aqueous zinc chloride solution should preferably be about 68-73% by weight, which corresponds to a specific gravity at 25° of about 1.87-1.95.

The temperature of operation may vary within relatively wide limits depending largely upon the particular reactants, catalysts, and results desired. In general, the reaction temperature should be below that giving rise to decomposition of the reactants and reaction products. The reaction of hydrogen chloride and ethyl alcohol, in the presence of zinc chloride, as herein described, is preferably carried out at a temperature within the range of 110°-150° C. and especially desirable results have been obtained in operating the process at temperatures of about 135-140° C.

The pressure under which the reaction of the hydrogen halide and alcohol is conducted is subject to relatively wide variation. Generally speaking, it is preferable to operate at atmospheric pressure but good results are obtained by operating under superatmospheric pressures.

The proportions of hydrogen halide and alkyl alcohol employed may vary widely but should preferably correspond to at least one molecular equivalent of hydrogen halide for each molecular equivalent of alcohol. In general, it is preferable to employ about 10-50% hydrogen halide in excess of the stoichiometrically equivalent proportions of alcohol. In the production of ethyl chloride, the hydrogen chloride gas introduced into the catalyst solution may contain impurities such as, for example, air and hydrogen but should preferably have a purity greater than about 95%.

It will be understood throughout the specification and claims that by the expression "equilibrium concentration" is meant the concentration which the catalyst solution attains when in dynamic equilibrium with the alcohol and hydrogen halide at reaction temperature.

A particular advantage of the invention is that by its application ethyl chloride may be produced by an autothermal reaction since it is possible to preserve the dilution of the catalyst solution to the preferred concentration and still maintain the temperature thereof at or slightly above 135° C. without external heating or cooling. The process is further advantageous in that the yields based upon the quantities of raw materials treated are relatively high, even at high rates of production. Furthermore, the process is readily controlled and does not require a large amount of equipment and space for its operation.

As many apparent and widely different embodiments of this invention may be made without departing from the spirit thereof, it is to be understood that we do not limit ourselves to the foregoing examples or description except as indicated in the following claims.

We claim:

1. The process of producing an alkyl halide which comprises reacting an alkyl alcohol with a hydrogen halide in the presence of a solution of a metal halide catalyst for the reaction, maintained at reaction temperature and having a concentration below the equilibrium concentration at said temperature.

2. The process of producing alkyl halides which comprises reacting an alkyl alcohol and a hydrogen halide in the presence of a solution of a metal chloride capable of promoting reaction between said alcohol and said hydrogen halide, said metal halide solution being maintained at a temperature between about 100-150° C. and having a concentration below its equilibrium concentration at the reaction temperature.

3. In a process of producing an alkyl chloride, the step which comprises passing a vapor mixture containing an alkyl alcohol and hydrogen chloride into an aqueous metal chloride solution capable of promoting reaction between said alcohol and said hydrogen chloride at a temperature between 110° and 150° C. and maintaining the volume and concentration of said metal chloride solution substantially constant but substantially below the equilibrium concentration at the reaction temperature by adding water thereto.

4. In a process of producing an alkyl chloride, the step which comprises passing a vapor mixture containing alcohol and hydrogen chloride into an aqueous zinc chloride solution maintained at a temperature between 110° and 150° C. removing the evolved vapors and maintaining the volume of said zinc chloride solution substantially constant but substantially below the equilibrium concentration at the reaction temperature by adding water thereto.

5. In a process of producing alkyl chlorides by the reaction of an alkyl alcohol and hydrogen chloride in the presence of an aqueous zinc chloride solution, the improvement which comprises maintaining the zinc chloride solution at a concentration of about 68-73%.

6. In a process of producing ethyl chloride by the reaction of ethyl alcohol and hydrogen chloride in the presence of an aqueous zinc chloride solution, the improvement which comprises maintaining the zinc chloride solution at a concentration of about 68-73%.

7. The process of producing ethyl chloride which comprises reacting together ethyl alcohol and hydrogen chloride at a temperature of about 135°-140° C. in an aqueous solution of zinc chloride maintained at a concentration of about 68-73%.

8. The process of producing ethyl chloride which comprises reacting together ethyl alcohol and hydrogen chloride in proportions corresponding to at least one mole of hydrogen chloride per mole of alcohol in the presence of an aqueous zinc chloride solution and at a temperature within the range of about 110°-150° C., removing the water vapor and ethyl chloride evolved, and maintaining the concentration of the zinc chloride solution at about 68-73% by condensing at least a part of the evolved water and returning it to said solution.

9. The process of producing ethyl chloride which comprises reacting together ethyl alcohol and hydrogen chloride in proportions corresponding to at least one mole of hydrogen chloride per mole of alcohol in the presence of an aqueous zinc chloride solution and at a temperature of about 135°-140° C., removing the water vapor and ethyl chloride evolved, and maintaining the concentration of the zinc chloride solution at about 68-73% by condensing at least a part of the evolved water and returning it to said solution.

10. The process of producing ethyl chloride which comprises simultaneously passing vaporous ethyl alcohol and at least a molecular equivalent quantity of hydrogen chloride into an aqueous solution of zinc chloride of 68-73% concentration maintained at a temperature of about 135° C., continuously removing the water vapor and ethyl chloride evolved and maintaining the said concentration of the zinc chloride solution by condensing a portion of the evolved water and returning it to the reaction zone.

11. The process of producing an alkyl chloride having less than four carbon atoms, which comprises reacting an alkyl alcohol having less than four carbon atoms with hydrogen chloride in the presence of a solution of zinc chloride maintained at reaction temperature and having a concentration below the equilibrium concentration at said temperature.

12. The process of producing alkyl chlorides having less than four carbon atoms, which comprises reacting together an alkyl alcohol having less than four carbon atoms and hydrogen chloride at a temperature of about 135° C. to about 140° C. in an aqueous solution of zinc chloride maintained at a concentration of about 68% to about 73%.

13. The process of producing an alkyl chloride having less than four carbon atoms, which comprises reacting together an alkyl alcohol having less than four carbon atoms and hydrogen chloride in proportions corresponding to at least one mole of hydrogen chloride per mole of alcohol, in the presence of an aqueous zinc chloride solution and at a temperature within the range of about 110° C. to about 150° C., removing the water vapor and alkyl chloride evolved, and maintaining the concentration of the zinc chloride solution at about 68% to about 73% by condensing at least a part of the evolved water and returning it to said solution.

14. The process of producing an alkyl chloride having less than four carbon atoms, which comprises reacting together an alkyl alcohol having less than four carbon atoms and hydrogen chloride in proportions corresponding to at least one mole of hydrogen chloride per mole of alcohol, in the presence of an aqueous zinc chloride solution and at a temperature of about 135° C. to about 140° C., removing the water vapor and alkyl chloride evolved, and maintaining the concentration of the zinc chloride solution at about 68% to about 73% by condensing at least a part of the evolved water and returning it to said solution.

LEE CONE HOLT.
HERBERT WILKENS DAUDT.